//

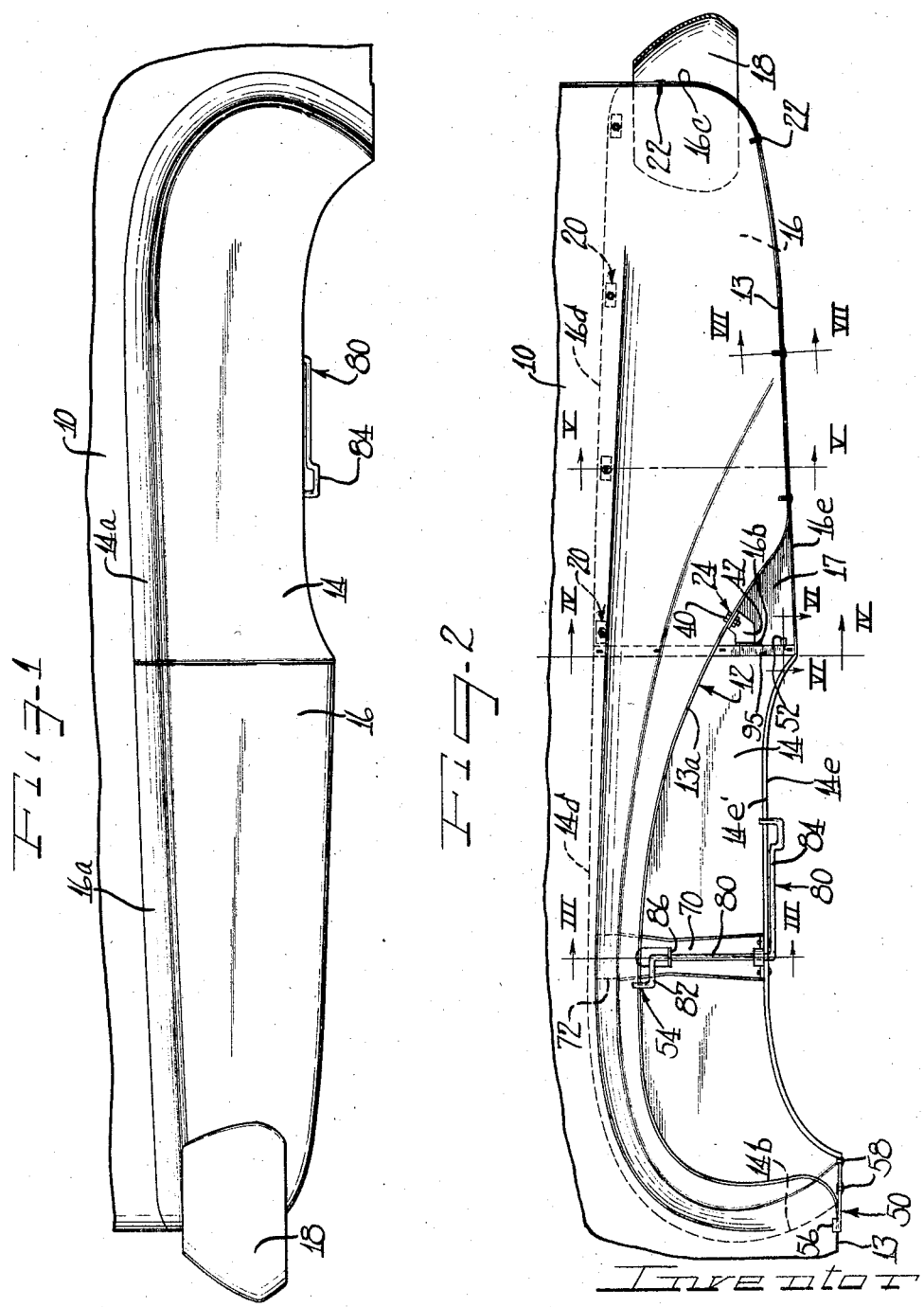

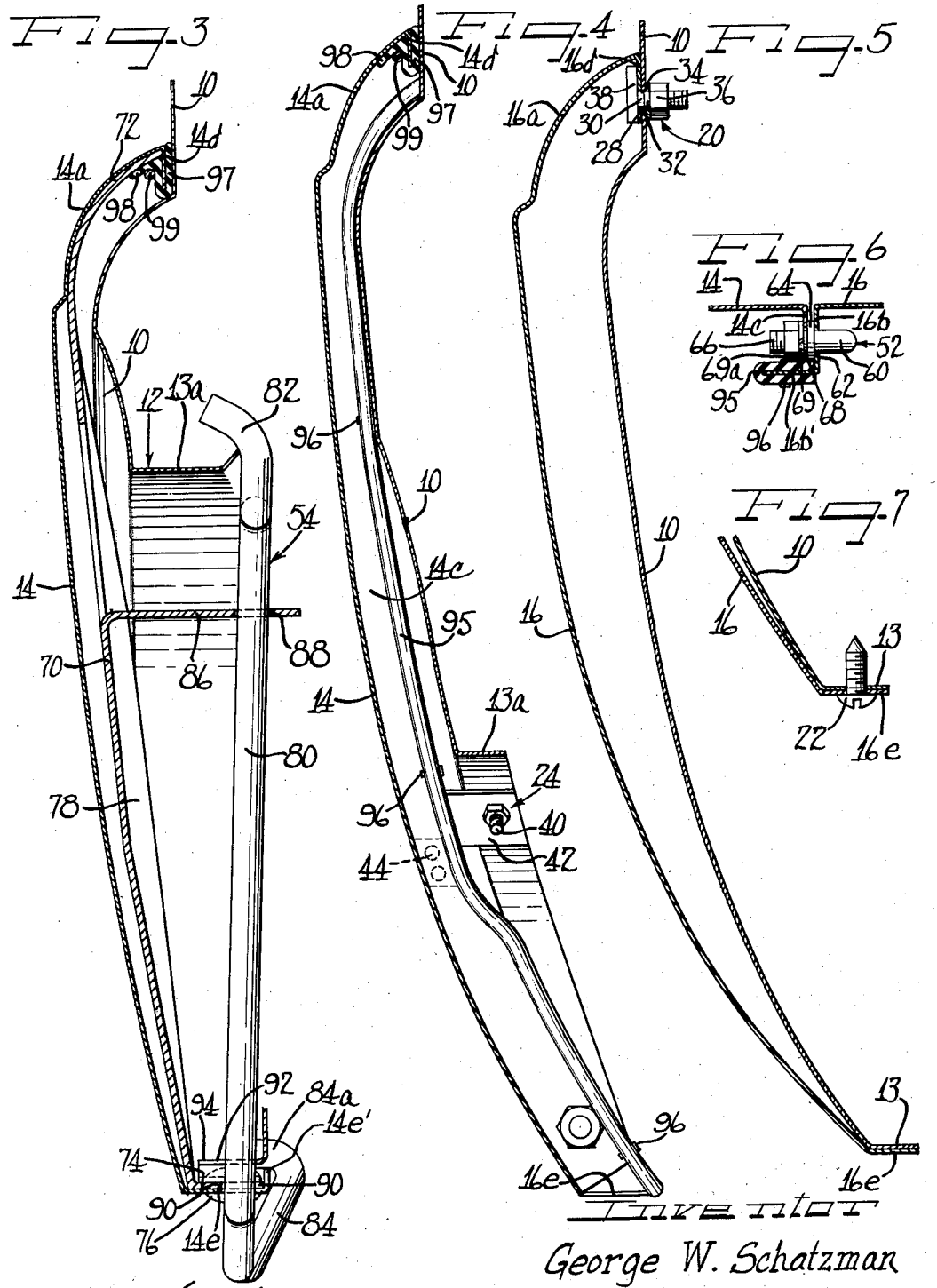

United States Patent Office 2,892,637
Patented June 30, 1959

2,892,637

FENDER AND FENDER SHIELD CONSTRUCTION

George W. Schatzman, Detroit, Mich., assignor to Houdaille Industries, Inc., Buffalo, N.Y., a corporation of Michigan Application November 21, 1955, Serial No. 547,889

9 Claims. (Cl. 280—153)

The present invention relates to improvements in fender and fender skirt or shield assemblies. More particularly, the present invention relates to improvements in the construction and mounting of a fender skirt or shield of a fender, and to the provision of a multi-section skirt or shield adapted to cover part of the wheel access opening of a fender and to overlie a span of the fender portion adjacent the wheel access opening.

In the vehicle industry, and particularly in the automobile branch thereof, various means have been utilized to improve the appearance of vehicle fenders. The usual vehicle fender is provided with an opening affording access to the vehicle wheel, and permitting ready removal or replacement of the wheel in an axial direction. Since this opening presents what is considered an unattractive outward appearance, and in high speed operation is an air turbulence factor, detachable fender shields have been employed to cover the opening protectively and ornamentally.

As the term "fender shield" shall hereinafter be employed, it refers to any member which is adapted to be secured to a fender or other portion of a vehicle body for the purpose of substantially covering the opening in the fender or vehicle body and which opening is provided for access to or removal of a vehicle wheel.

As the term "fender cover" shall be hereinafter employed, it refers to any member which is adapted to be secured in overlying relationship to a span of a vehicle fender or other portion of a vehicle body adjacent a wheel access opening thereof.

Furthermore, as the term "fender" shall hereinafter be employed, it refers to any form of wheel housing or fender in its broad sense, whether such fender be separable from the vehicle body part, partly separable from the vehicle body part, or actually an integral part of the vehicle body, and whether or not it projects outwardly from the principal body portion of the vehicle.

An object of the present invention is to provide a novel fender and fender shield assembly.

Another object is to provide a new and improved fender shield assembly in which the fender shield is secured to the fender in a novel manner.

A further object is to provide a fender shield assembly having portions thereof overlying the wheel access opening of a fender and also overlying a span of the fender adjacent such opening.

Another object of the invention is to provide a two-section fender-shield assembly, one section being adapted to be permanently mounted to the fender-portion adjacent the wheel access opening thereof, and another section being adapted to be detachably secured to the fender and to the other shield section.

These and other objects, features and advantages of the present invention will be readily apparent from the following description of an exemplary preferred embodiment thereof, taken in conjunction with the accompanying drawings, in which:

Figure 1 is a fragmentary side elevational view of a fender and fender shield construction embodying the features of the present invention;

Figure 2 is a fragmentary side elevational view of the fender and fender shield construction shown in Figure 1, as viewed outwardly from the inside thereof;

Figure 3 is an enlarged transverse cross-sectional detail view taken substantially on the line III—III of Figure 2;

Figure 4 is a transverse cross-sectional view similar to Figure 3, but taken substantially on the line IV—IV of Figure 2;

Figure 5 is a transverse cross-sectional view similar to Figure 3, but taken substantially on the line V—V of Figure 2;

Figure 6 is a sectional detail view taken substantially along the line VI—VI of Figure 2; and Figure 7 is a cross-sectional view taken substantially along the line VII—VII of Figure 2.

An exemplary form of the invention is shown in the drawings, in conjunction with a fender 10 of the vehicle, the fender having a wheel access opening 12. Inturned stiffening flanges 13 extend from marginal edges of the fender, that portion of the fender marginal flange 13 in the region of the wheel access opening being indicated at 13a.

In accordance with the present invention, I provide a fender shield assembly comprising a fender shield 14 generally overlying the wheel access opening 12 of the fender 10, and an associated fender cover 16 generally overlying the span of the fender 10 rearwardly adjacent the wheel access opening. It should be noted that desirably a portion 17 of the fender cover 16 extends forwardly into the wheel access opening.

Desirably, the fender shield 14 and the fender cover 16 generally comprise sheet-metal panels stamped and formed to provide the desired configuration and appearance. Depending upon their color and configuration, which may be made contrasting with or co-ordinated as desired with the color and general styling of the fender 10 and adjacent portions of the vehicle body, the shield 14 and cover 16 can be made if desired to effect a significant component in the appearance and style of the vehicle. Adding to an appearance of integralness of the panels 14 and 16, and providing pleasing lines and styling, and providing junction with the exposed surface of the fender 10, the forwardly facing margin of the fender shield 14 and the upper margins of the fender shield 14 and fender cover 16 are shown as provided with an arcuately-formed marginal bead 14a and 16a, respectively.

Stiffening beads or flanges and the like may desirably be provided for each of the panels 14 and 16. In the embodiment illustrated, stiffening beads are provided by the beads 14a—16a just described. Moreover, for stiffening and other purposes more fully evident hereinafter, marginal edges of each of the panels 14 and 16 are inwardly turned. In the drawings such flanges of the fender shield panel 14 and fender cover panel 16 are denoted 14b, 14c, 14d, and 14e, and 16b, 16c, 16d, and 16e, respectively, the subscripts b, c, d, and e in each case denoting the flanges respectively along the forward, rearward, upper, and lower panel edges. The inwardly turned rearward flange 16c of the fender cover 16 desirably is extended to wrap around the rear of fender 10, inwardly of the car bumper 18.

Means are provided for permanently securing the fender cover 16 to the fender portion rearwardly of the wheel access opening 12. As shown, such means comprise a series of fastener elements 20 extending along the upper edge of the cover 16, a series of fastener elements 22 extending along the lower end rearward edges of the cover 16, and a fastening means 24 connecting the front portion of the cover 16 to the fender portion defining the wheel axis opening 12.

The fastener elements 20 are desirably concealed from observance from the outside of the fender. Thus, the upper marginal flange 16d of the cover 16 is provided with a longitudinally spaced series of openings 28 adapted to receive the shanks of a fastening member such as screws or bolts 30 extending through the flange openings 28 and through aligned openings 32 provided in the fender 10. Means such as a lock washer 34 and nut 36 maintain such fasteners in secured condition. Desirably, the head 38 of screw 30 is enlarged to provide a broad bearing surface for holding the cover 16 tightly against the fender 10.

The fastening means 22 provided for holding the lower and rearward portions of the cover 16 to the fender 10 may for example be bolts or screws which pass through aligned openings suitably provided in the juxtaposed flanges provided by the stiffening flange 13 of the fender 10 and by the lower stiffening flange 16e of the cover 16 and of the rear wrap-around portion 16c of the cover 16.

The fastening means 24 which secures the cover 16 to the fender-flange 13a defining the wheel access opening 12 is shown as a fastener such as a bolt means 40 extending between that fender-flange 13a and a bracket 42 secured as by welding 44 to the inturned flange 16b at the forward edge of the cover 16. Bracket 42 may be desirably made as a sheetmetal stamping.

The fender shield 14, which generally covers the wheel access opening 12 of the fender 10, is provided with means for releasably securing it in such position, whereby it may be readily released to obtain full access to the wheel. As shown, such securing means desirably includes means to secure the fender shield 14 both to the fender 10 and to the fender cover 16. The fender shield 14 is shown as held at least three points to obtain desired tightness. Thus, the lower forward portion of the shield 14 is secured as by fastening means 50 to the fender 10, the lower rear portion of shield 14 is secured as by fastening means 52 to that portion 17 of the fender cover 16 which extends into the rear portion of the wheel access opening 12, and a central upper portion of the shield 14 is held as by fastening means 54 to the adjacent portion of fender 10.

The fastening means 50 at the forward, lower portion of shield 14 desirably comprises a finger 56 which embraces an adjacent portion of the fender-stiffening flange 13. Desirably, as shown, the finger 56 is formed as a separate member as from heavy sheet-metal, and secured as by rivets 58 to the fender shield 14, desirably to the forward edge of the inturned stiffening flange 14e of the fender shield 14. Desirably, the finger 56 is provided to engage the fender-flange 13 along a longitudinally extending run thereof, permitting the fender shield to be manipulated rearwardly a slight amount after engagement of the finger 56 to permit engagement of the fastening means 52 now to be described.

A desirable form of fastening means 52 is shown in Figure 6. As there shown, such means desirably includes a rearwardly extending finger-like member such as a pin 60 carried by the fender shield 14 and adapted to extend through an opening 62 provided in the inturned flange 16b at the forward edge of the cover 16. The pin 60 is shown as formed as an elongation of a head 64 of a screw 66 extending through an opening 68 provided in the inturned rearward flange 14c of the fender shield 14 and held thereto as by lock washer 69 and nut 69a.

In establishing the connection provided by the securing means 52, the forward securing means 50 is first obtained as by hooking finger 56 over the fender-flange 13 as above described, and then the pin 60 of the rear securing means 52 is brought into registry with the fender cover opening 62; then the fender shield 14 is desirably slid rearwardly until the pin 60 projects into the opening 62.

For maintaining the upper portion of the fender shield 14 in assembled relation with the fender 10, the securing means 54 desirably comprises the latching mechanism shown, and may be generally as shown in my prior U.S. Patent 2,334,867, issued November 23, 1943. Latching mechanism 54 thus comprises a vertical strut 70 preferably formed from appropriate gauge sheet metal mounted vertically at approximately the center of the fender shield panel 14, the strut shown as having an upper terminal flange portion 72 engaging behind the flange 14d extending downwardly from the upper edge of the marginal bead 14a of the fender shield 14. At its lower end, the strut 70 is preferably secured to the lower marginal portion of the fender 14, and for this purpose has an angular inwardly extending foot flange 74 which lies along the inturned lower flange 14e of the fender shield, where it is held as by rivets 76. For a substantial portion of its height, the strut 70 is preferably reinforced by means of angular side flanges 78.

Supported by the strut 70 for rotational and reciprocal latch operational movement is a torsion-latch rod 80. This latch rod 80 is preferably formed from a single piece of suitable gauge wire or rod stock of a material having adequate resilience for the present purpose. Approximately quarter inch steel stock of suitable grade has been found satisfactory. At its upper end, the torsion latch rod 80 is formed with an angular latching head 82, while at its lower end portion, the torsion rod is formed to provide an angular handle 84 preferably extending to the opposite side of the body of the latch rod from the latching head 82.

Rotary and reciprocal guiding of the latch rod 80 is accomplished through the medium of a guide and journal ear 86 shown as struck integrally from the body of the strut 70 and providing a journal or bearing aperture 88 through which the body of the latch rod 80 extends below the latching head 82. Adjacent to the lower end of the latch rod 80, a bearing is provided by the superimposed foot flange 74 and the lower fender shield reinforcing flange 14e, those flanges being formed with inwardly opening registering slots 90. A retaining plate 92 having an outwardly opening slot 94 is shown as secured by the rivets 76 to the foot flange 74. The outwardly opening slot 94 of the retaining plate 92 and the inwardly opening slot 90 of the superimposed flanges 74 and 14e thus cooperate to effectuate the lower bearing for the latch rod 80.

After the forward and rearward securing means 50 and 52 have been established, securing means 54 is established by moving latch rod 80 upwardly and rotating its handle 84 to cause the latching head 82 to latchingly engage against and over the inturned stiffening flange 13a of the fender 10. Then the latch handle 84 is secured by hooking a terminal lug 84a thereon over an upwardly turned extension 14e' of the flange 14e along the lower edge of the fender shield 14. Latch release is effected by unhooking and rotating handle 84 to cause the latching head 82 to be disengaged from the fender flange 13a.

It will be noted that the spacing between the upper bearing ear 86 and the lower flange bearing 90—94 for the latch rod 80 is less than the spacing between the latching head 82 and the handle 84 so that the latch rod is afforded a sufficient range of vertical or reciprocal movement to permit the same to move from the upper or latching position, as shown in Figures 2 and 3, to a lowered position wherein the latching head 82 will clear the fender flange 13a to permit mounting and demounting of the fender shield 14.

Providing a cushioned and rattle-free carry of fender shield 14 are sealing or gasket strip means now to be described. Such strips are desirably formed from a flexibly resilient material such as rubber or an appropriate rubber substitute.

Thus a resilient strip 95 is desirably provided along the front edge of cover panel 16. The strip 95 is shown as generally U-shaped in cross-section, its walls embracing a forwardly turned extension 16b' of the cover flange 16b, and held thereto as by staples 96. The rear flange 14c of shield panel 14 seats against the inner wall of the strip 95.

For like purposes, a cushioning strip 97 is provided along the forward and upper edges of shield panel 14. As shown, the strip 97 is generally U-shaped in cross section, with its walls embracing the downturned flange 14d running along the top edge of shield 14, and extends forwardly along the forward flange 14b of the shield 14. Along the outer wall of such strip 97 there extends an outwardly extending flange 98 adapted to underlie the upper portion 14a of shield 14, and in the region of strut 70 to underlie the upper flange 72 of strut 70, and along the forward edge of panel 14 to underlie the forward shield flange 14b. Means such as a retainer wire 99 or the like desirably extends along the strip 97 at the junction of the flange 98 and the adjacent strip-wall to retain the cushioning strip 97 assembled onto the shield 14.

It will thus be seen from the foregoing description of my invention according to an exemplary preferred embodiment, considered in conjunction with the accompanying drawings, that the present invention provides a new and improved fender shield construction and assembly having the desired advantages and characteristics, and accomplishing its intended objects, including those hereinbefore pointed out and others which are inherent in the invention as described.

It will be understood that modifications and variations may be effected without departing from the scope of the novel concepts of the present invention.

I claim as my invention:

1. A fender shield assembly, comprising a multiplicity of members, one of which provides a fender shield adapted to generally overlie the wheel access opening of the associated fender, and another of which provides a fender cover adapted to generally overlie a portion of fender adjacent such wheel access opening, said cover comprising a panel like member provided along its forward edge with an inturned flange, a portion of which is turned forwardly to provide a forwardly directed vertically extending flange means, cushion means provided along the outer face of said flange means, an adjacent portion of said fender shield being provided with an inturned flange means for bearing against said cushion means when the shield and cover are assembled onto the associated fender.

2. A fender shield assembly, comprising a multiplicity of members, one of which provides a fender shield adapted to generally overlie the wheel access opening of the associated fender, and another of which provides a fender cover adapted to generally overlie a portion of fender adjacent such wheel access opening, said cover comprising a panel-like member provided along its forward edge with an inturned flange, a portion of which is turned forwardly to provide a forwardly directed vertically extending flange means, resilient cushion strip means of a general U-shape in cross section being provided for said flange means, opposed walls of said strip means embracing said flange means and secured thereto, the adjacent portion of said fender shield being adapted to seat against said strip means when the shield and cover are assembled.

3. A fender shield assembly, comprising a multiplicity of members, one of which provides a fender shield adapted to generally overlie the wheel access opening of the associated fender, and another of which provides a fender cover adapted to generally overlie a portion of fender adjacent such wheel access opening, said cover comprising a panel like member provided along its forward edge with an inturned flange, a portion of which is turned forwardly to provide a forwardly directly vertically extending flange means, said fender shield having a rear end portion cooperatively engageable with said cover at its forward edge, and said fender shield being provided on its rear end portion with an inturned flange means for bearing toward said vertically extending flange means of the cover when the shield and cover are assembled onto an associated fender.

4. In a fender and fender shield assembly, a fender having a downwardly opening wheel access opening, and a fender cover and shield assembly including a cover panel fixedly secured to the fender and partially overlapping one end portion of the wheel access opening, said fender shield being dimensioned to overlie the remainder of the wheel access opening with an end portion of the fender shield adjacent to and arranged to provide with the portion of the cover that overlaps the wheel access opening a continuous panel effect, means detachably connecting the adjacent end portions of the panel and shield, means detachably connecting the opposite end portion of the shield to the fender, and means carried relatively moveably by the fender shield engageable in response to manual actuation with the fender at the top of the wheel access opening and releasably manipulable by movement relative to the fender shield and the fender for detaching the fender shield.

5. In a fender and fender shield assembly, a fender having a wheel access opening, a fender cover overlying a portion of the fender beyond the wheel access opening and having an end portion overlapping an adjacent portion of the wheel access opening, a fender shield for closingly overlapping the remainder of the wheel access opening and having means for detachably securing the fender shield to the fender and to said cover, and a bracket carried by the fender and projecting into the wheel access opening and fixedly securing the wheel access opening end portion of the cover.

6. In a fender and fender shield assembly including a fender having a wheel access opening and being defined at the wheel access opening and in the portions thereof adjacent thereto with an inturned flange, a fender cover overlapping a substantial portion of the fender beyond one end of the wheel access opening and having an end portion overlappingly disposed with respect to the adjacent portion of the wheel access opening, said cover having an inturned flange on a lower portion thereof underlapping the fender flange and secured thereto, and a fender shield for closing the remainder of the wheel access opening and provided with means for detachably engaging the fender and said cover.

7. In a fender and fender shield assembly, a fender having a downwardly opening wheel access opening, a cover secured in overlapping relation to a substantial portion of the fender beyond the wheel access opening and having an end portion lying in closing relation to a substantial adjacent end portion of the wheel access opening, a fender shield for closing the remainder of the wheel access opening and overlapping the fender, said fender shield having an end portion constructed and arranged to substantially match with the wheel access opening end portion of the cover with means at the adjacent ends of the cover and fender shield effecting connection by endwise movement of the fender shield toward the cover, the opposite end of the fender shield having means engageable with the lower portion of the fender beyond the wheel access opening and enabling relative assembly movement of the fender shield with respect to both the fender and the cover, and latching means carried relatively moveably by the fender shield and detachably engageable in response to manual actuation relative to the fender and fender shield with the fender adjacent the upper portion of the wheel access opening.

8. In a fender and fender shield assembly, a fender having a wheel access opening, and a cover and fender shield assembly for overlapping assembly on the outer side of the fender and in closing relation to the wheel access opening, means on the fender above the wheel access opening engageable by a downturned upper marginal flange on the cover to suspend the cover on the fender, the adjacent lower portion of the fender having an inturned flange and the cover having an inturned flange underlapping the fender flange, means securing the fender and cover flanges together, and means detachably securing the fender shield to the fender and the cover.

9. A fender shield assembly, comprising a multiplicity of members, one of which provides a fender shield adapted to generally overlie the wheel access opening of the associated fender, and another of which provides a fender cover adapted to generally overlie a portion of fender adjacent such wheel access opening, said cover comprising a panel like member provided along its forward edge with an inturned flange, a portion of which is turned forwardly to provide a forwardly directed vertically extending flange means, and an end portion on the fender shield provided with an inturned flange adapted for nesting assembly with the flange means of the cover, and projection and aperture means on the adjacent inturned flanges interengageable by relative assembly movement of the fender flange toward the cover flange.

References Cited in the file of this patent

UNITED STATES PATENTS

| | | |
|---|---|---|
| 2,319,936 | Lyon | May 25, 1943 |
| 2,352,421 | Wohlfield | June 27, 1944 |
| 2,417,324 | Rivard et al. | Mar. 11, 1947 |
| 2,538,839 | Limberg | Jan. 23, 1951 |
| 2,609,218 | Van Antwerp | Sept. 2, 1952 |
| 2,654,617 | Anschuetz | Oct. 6, 1953 |
| 2,686,062 | Schatzman | Aug. 10, 1954 |